No. 639,304. Patented Dec. 19, 1899.
J. A. SMITH.
HARROW.
(Application filed May 18, 1899.)

(No Model.) 2 Sheets—Sheet 1.

Witnesses John A. Smith, Inventor.

By his Attorney

THE NORRIS PETERS CO., PHOTO-LITHO., WASHINGTON, D. C.

No. 639,304.  Patented Dec. 19, 1899.
J. A. SMITH.
HARROW.
(Application filed May 18, 1899.)
(No Model.) 2 Sheets—Sheet 2.

Witnesses  Inventor.
J. Frank Culverwell.  John A. Smith,
H. F. Beachem.  By his Attorney  E. G. Siggers.

THE NORRIS PETERS CO., PHOTO-LITHO., WASHINGTON, D. C.

UNITED STATES PATENT OFFICE.

JOHN A. SMITH, OF KINGSTON, ARKANSAS, ASSIGNOR OF ONE-HALF TO HARVY G. BRASHEARS, OF ST. PAUL, ARKANSAS.

HARROW.

SPECIFICATION forming part of Letters Patent No. 639,304, dated December 19, 1899.

Application filed May 18, 1899. Serial No. 717,294. (No model.)

*To all whom it may concern:*

Be it known that I, JOHN A. SMITH, a citizen of the United States, residing at Kingston, in the county of Madison and State of Arkansas, have invented a new and useful Harrow, of which the following is a specification.

My invention relates to harrows of that class which are equipped with means for cutting sod or cornstalks in advance of the harrow-teeth; and the primary object of the invention is to provide a simple implement with means by which accumulations of trash on the harrow-teeth may be readily removed, so that the teeth may act advantageously to break up and pulverize the clods and the crusted surface.

A further object of the invention is to provide a cutter mechanism which may be easily adjusted into or out of operative position, and this cutter mechanism and the teeth-clearing means are controlled from a single lever within convenient reach of the driver.

A further object of the invention is to provide the implement with means by which the penetration of the harrow-teeth may be easily regulated without requiring the operator to leave his seat on the machine.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1:
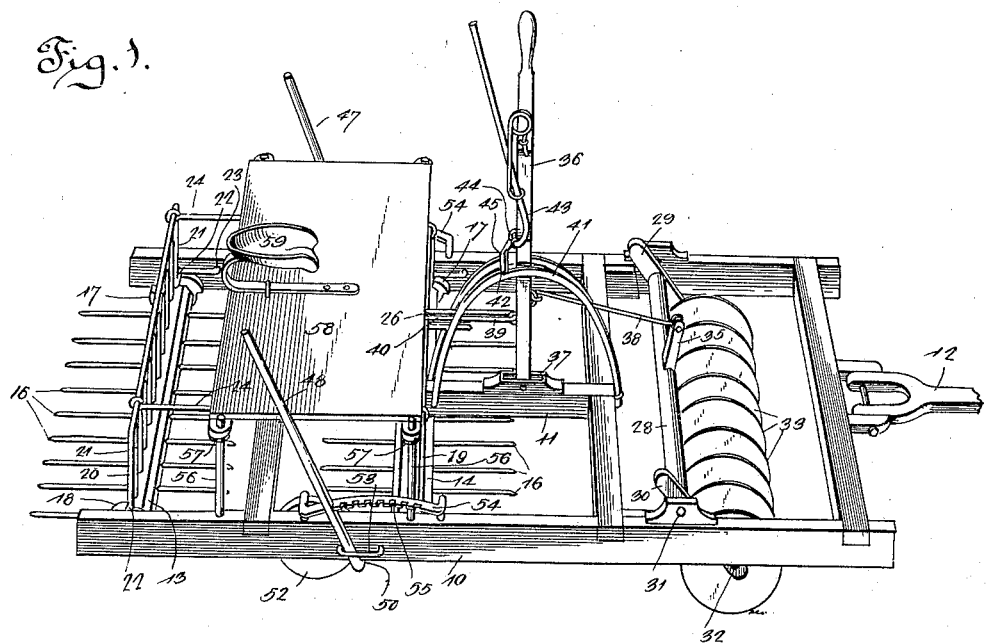
Figure 2:
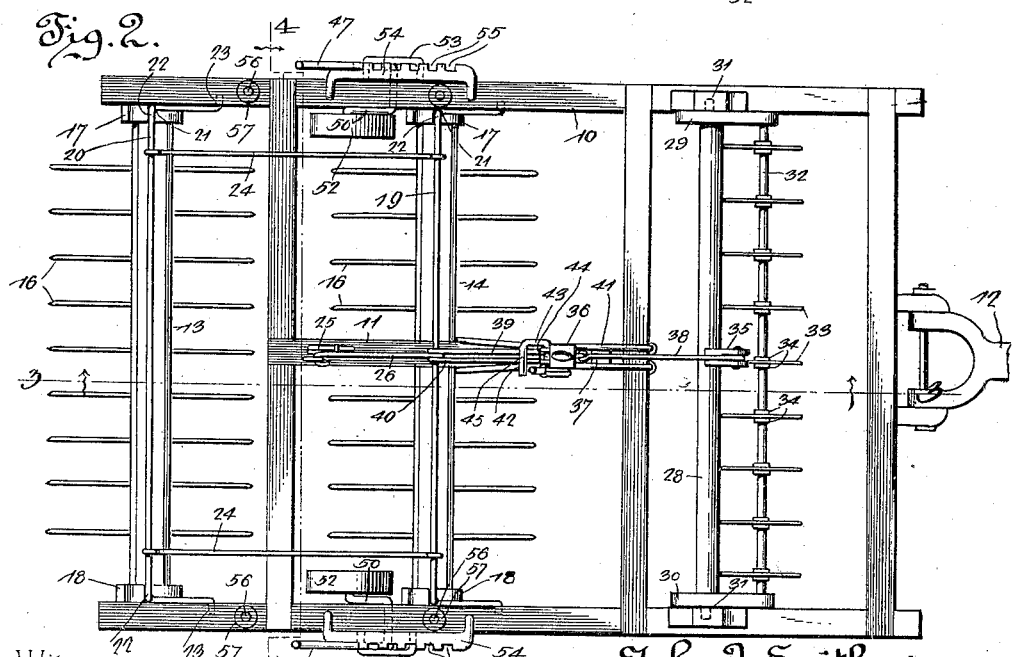
Figure 3:
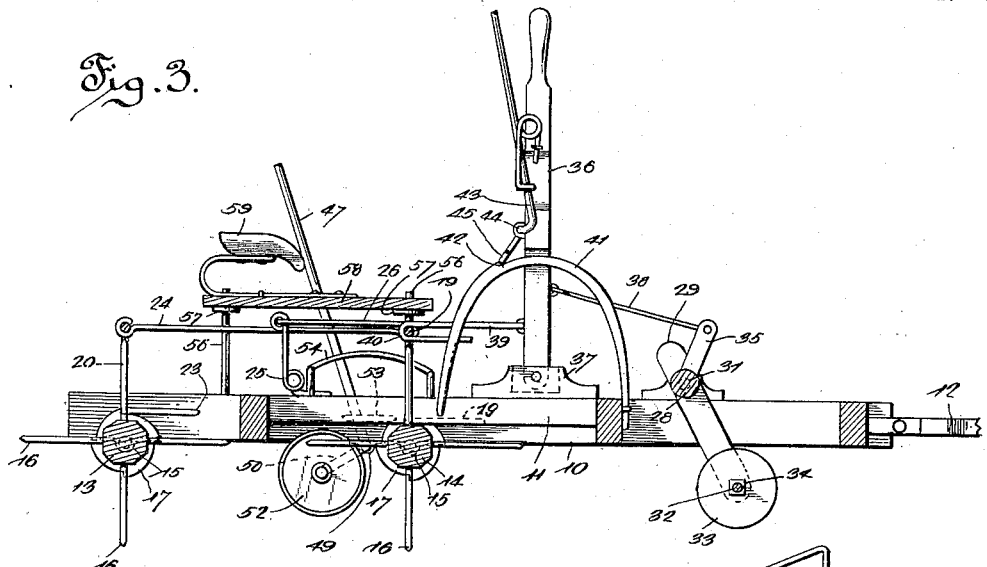
Figures 5, 6:
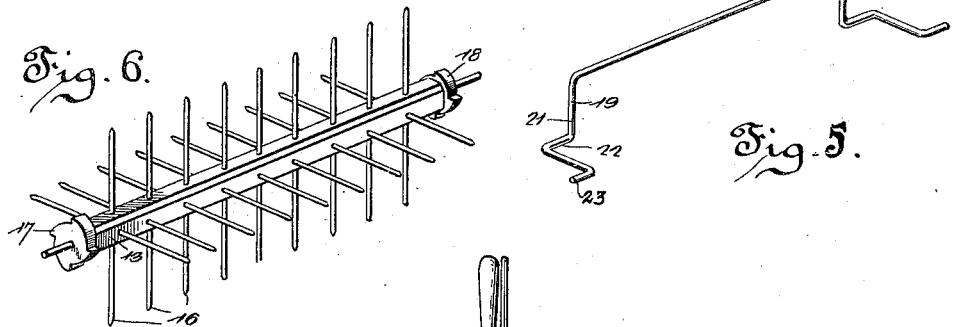
Figure 4:
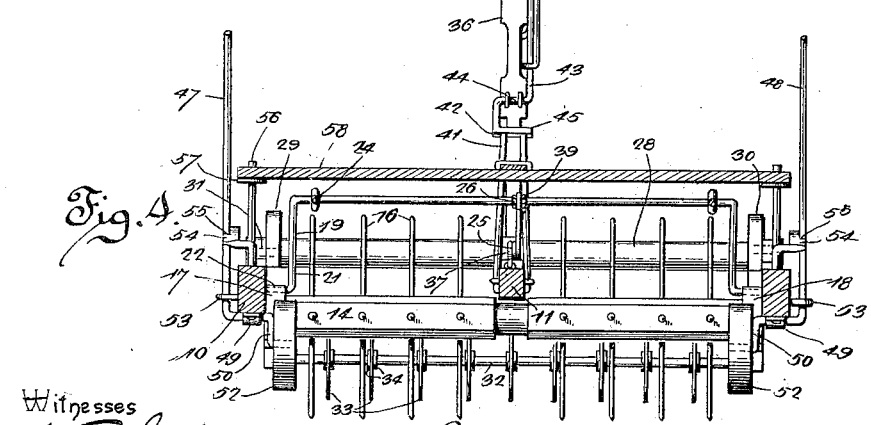

Figure 1 is a perspective view of a harrow constructed in accordance with my invention. Fig. 2 is a plan view of the implement with the seat and its platform removed. Fig. 3 is a longitudinal sectional view on the plane indicated by the dotted line 3 3 of Fig. 2. Fig. 4 is a vertical transverse sectional elevation on the line 4 4 of Fig. 2. Fig. 5 is a detail perspective view of one of the cranked locking-bails, and Fig. 6 is a similar view of one toothed shaft.

The same numerals of reference are used to indicate like and corresponding parts in each of the several figures of the drawings.

The main frame 10 of my improved implement consists of suitable side and cross rails joined firmly together, and this frame is provided with a short longitudinal rail 11, which is arranged centrally of the machine to support the lever which controls the sod-cutting appliance and the locking devices for the toothed shafts. An ordinary draft-tongue 12 is connected in any suitable way to the front end of the frame, and with this draft-tongue is combined the usual draft appliance.

13 14 designate the transverse shafts, which carry the plurality of series of harrow-teeth, and one of these shafts is arranged at the rear end of the frame 10, while the other shaft is disposed transversely at a point intermediate of the length of said frame, so as to lie below the longitudinal rail 11. Said shafts are journaled for axial rotation in bearings 15, which are secured firmly to the frame, preferably on the lower sides thereof, and each shaft is equipped with rows of teeth 16. The teeth on the shafts are arranged in a plurality of rows or series, and with the shafts are associated locking devices which tend to hold said shafts in positions where each shaft will present one row of teeth to the ground; but should the teeth become clogged by accumulations of trash the locking devices are adapted to be manipulated by the operator for the purpose of freeing said locking devices from engagement with the shafts temporarily, whereby the shafts are permitted to partly rotate in order that the series of teeth obstructed by the accumulations of trash may move in a rearward and upward direction, while another series of teeth on said shafts are brought into operative positions. Each shaft is equipped near its ends with shouldered collars 17 18, which may be fast to the shaft beyond the series of teeth thereon, and with the shouldered collars of the two shafts 13 14 are adapted to engage the locking-bails 19 20, one of said bails being disposed in close operative relation to each of the toothed shafts. Each locking-bail is bent, preferably, from a single piece of rod or bar metal to form the cranks 21, and between the ends of the bail and the cranks are provided the locking-shoulders 22, one of these shoulders being disposed at each end of the bail. The free ends of the cranks 21 on each locking-bail are bent to form the pivots 23, and these pivots are fitted loosely in suitable bearings on the side rails of the frame 10, so that each bail is mounted eccentrically on the frame and in a position for its locking-shoulders 22 to lie in the path of the shoulders on the locking-collars 17 18 on one shaft.

The locking-bails for the two toothed shafts are connected together for simultaneous movement by links 24, which are disposed longitudinally of the machine above its frame and near the sides thereof, and the ends of said links are fitted loosely to the cross-rods of the locking-bails, whereby the bails are made to move in unison, and they are free to turn in the loose connections formed by eyes on the ends of said links 24. The locking-bails are drawn or held normally in a position for the shoulders 22 to engage with the shouldered collars by a single spring 25, which has one end secured firmly to the rail 11 on the main frame, while its other end is connected to a link 26, which is fastened to the cross-bar of one of the locking-bails. As the two bails are connected together by the links 24, the spring 25 serves to actuate both bails, although said spring is attached to only one of said bails.

In equipping my machine with the sod and stalk cutting appliance I provide a cross-shaft 28, which is arranged in a horizontal position near the front end of the frame 10, and secured firmly to the ends of this shaft are the arms 29 30. These arms of the cross-shaft lie close to the side rails of the frame 10, and said arms are pivoted at points intermediate of their length to the frame 10, as indicated at 31. The cross-shaft is made fast with the arms 29 30 near one end thereof, and said arms serve to pivotally connect said shaft to the frame. In the opposite ends of the arms is supported a cross rod or shaft 32, and on this cross-rod is mounted the series of cutter-disks 33. Each cutter-disk is clamped firmly on the shaft by means of nuts 34, which are secured on threaded portions of the shaft 32 and bear laterally against the cutter-disks. It will be observed that the cross-shaft 28 may be operated to turn the arms 29 30 on their pivotal connection with the frame, and this adjustment of the shaft and arms changes the relation of the cutter-disks to the horizontal plane of the main frame, whereby the cutter apparatus may be moved into or out of operative position. The cross-shaft 28 of the cutter apparatus is provided with an arm 35, secured firmly to said shaft at a point intermediate of its length, and said arm is connected by a link 38 to an upright adjusting-lever 36, which is fulcrumed at its lower end to a fulcrum-block 37, fixed on the rail 11 of the main frame. This adjusting-lever 36 may be moved in a forward direction by the operator to lower the cutter apparatus into operative position, and the lever may be drawn in a rearward direction to raise the cutter apparatus out of service. This lever is, furthermore, connected loosely with one of the locking-bails through the medium of a link 39, which has its front end pivoted to the lever 36, while its rear end is bent or otherwise formed with a hook 40, adapted to slidably embrace the cross-rod of the locking-bail 19. The lever may be adjusted as required to operate the cutter apparatus, and the movement of said lever causes the link 39 to travel therewith. The rearward movement of the lever to raise the cutter apparatus adjusts the link 39 for its hook 40 to avoid interfering with the operation of the locking-bails; but a continued movement of the lever in a forward direction after lowering the cutter apparatus causes the hook 40 of the link 39 to move the locking-bails against the tension of the spring 25, whereby the locking-bails may be adjusted to raise the shoulders 22 thereof from the paths of the shoulders on the collars. It will thus be seen that the lever 36 controls the sod-cutting apparatus and also adjusts the locking-bails; but the locking-bails are operative by one adjustment only of the lever, so that the toothed shafts will normally remain in their fixed operative positions.

41 designates an arched standard, which is secured firmly to the frame 10 and its rail 11. The upper face of the standard is provided with one or more shoulders or notches 42, with which is adapted to engage the finger 45 of a locking-lever 43, said locking-lever being fulcrumed at a point intermediate of its length, as at 44, on the adjusting-lever 36. The locking-lever is thus mounted to move or travel with the adjusting-lever, and when the lever 36 is in an upright position the finger of the locking-lever engages with the central notch of the stand. In this adjustment of the lever 36 the spring 25 controls the locking-bails to restrain the shafts from rotation, and the sod-cutting appliance is lowered to its normal operative position; but when turning the machine at the end of a field or in traveling around a corner the operator should draw the lever rearwardly for the purpose of raising the cutter appliance above the ground.

I have also equipped my machine with ground-wheels and adjusting devices therefor in order to regulate the depth of penetration of the harrow-teeth into the ground. On the sides of the frame 10, between the toothed shafts, are provided the cranked levers 47 48, each of which is mounted in a bearing 49 on the frame 10. Said levers are provided with crank-arms 50, adapted to project below the side rails of the frame 10, on which are loosely mounted the ground-wheels 52. The upright parts of the levers play in keepers 53, fastened to the outside of the frame-rails, and each lever is adapted to engage with either of the series of notches 55 in a locking-bar 54, which is arranged in a substantially horizontal position on and is secured firmly to a side rail of the frame 10. It is evident that the levers may be moved rearwardly in order to lower the arms 50 and the ground-wheels 52, and this adjustment of the levers may be varied in order to lower the ground-wheels more or less for regulating the penetration of the teeth on the shafts 13 14, said levers being held in their adjusted positions by engagement with the locking-bars 54.

The standards 56 are secured firmly to the frame 10 and provided with shoulders 57 to support the seat-platform 58. This platform is arranged over the toothed shafts, and it supports the driver's seat 59, which may be of any suitable construction.

Changes in the form, proportion, size, and the minor details of construction within the scope of the appended claims may be resorted to without departing from the spirit or sacrificing any of the advantages of this invention.

Having thus described the invention, what I claim is—

1. A harrow consisting of a frame, a toothed shaft having the locking-collars, a locking-bail pivoted to the frame and having shoulders arranged to engage with said collars, a spring to normally hold the shoulders of the bail in the path of the collars, and means for moving the bail against the tension of its spring, substantially as described.

2. A harrow consisting of a frame, the independent toothed shafts mounted in said frame and having the shouldered collars, the locking-bails supported on the frame and having shoulders engaging with the collars of said shafts, a spring connected with one of said bails, and a lever also connected with a bail, substantially as described.

3. A harrow consisting of a frame, a toothed shaft mounted in said frame, a cutter appliance supported by the frame, a lever connected operatively with the cutter appliance, and a locking contrivance in operative relation with the toothed shaft and having connections with said lever to be actuated thereby in one period of movement of the lever, substantially as described.

4. A harrow, consisting of a frame, a toothed shaft having shoulders at its opposite ends, a locking-bail adapted to engage with said shoulders, a spring to normally hold the bail in engagement with one of the shoulders, and means for moving the bail against the tension of the spring, substantially as described.

5. A harrow consisting of a frame, toothed shafts mounted therein, a locking contrivance for said shafts, a sod-cutter appliance hung in said frame, a lever linked to the cutter appliance, a link between said lever and the locking contrivance for the toothed shafts, a notched arch adjacent to said lever, and a locking-lever mounted on the adjusting-lever in a position to engage with the notched arch, substantially as described.

6. A harrow consisting of a frame, toothed shafts mounted in said frame, a locking contrivance in operative relation to said shafts, a lever, a link pivoted to said lever and connected slidably with the locking contrivance to adjust the latter in one period of movement of the lever, a cutter appliance hinged to the frame and connected with the lever, ground-wheels supported by the frame at the sides thereof and in rear of the cutter appliance, and a lever mechanism for adjusting the ground-wheels independently of the cutter appliance and the locking contrivance for the toothed shafts, substantially as described.

In testimony that I claim the foregoing as my own I have hereto affixed my signature in the presence of two witnesses.

JOHN A. SMITH.

Witnesses:
W. G. LLOYD,
J. N. BUNCH.